Patented May 6, 1941

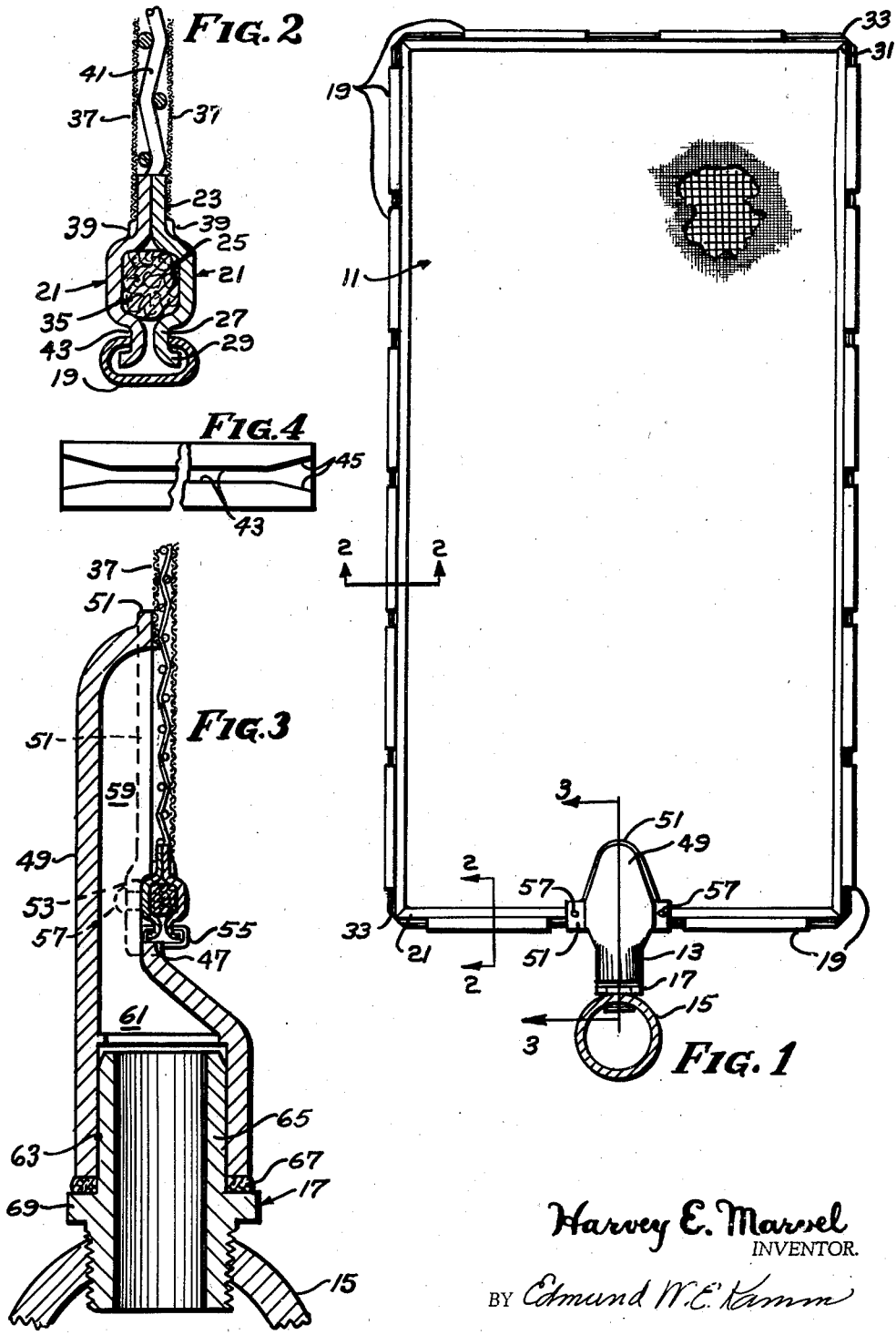

2,240,793

UNITED STATES PATENT OFFICE 2,240,793

SEPARABLE FILTER SCREEN

Harvey E. Marvel, Fort Wayne, Ind., assignor to S. F. Bowser & Company, Incorporated, Fort Wayne, Ind., a corporation of Indiana Application July 13, 1938, Serial No. 218,994

4 Claims. (Cl. 210—195)

This invention relates to filter elements or leaves which are used in filtration apparatus which is adapted to separate solids from valuable liquids and which may or may not employ diatomaceous earth or other filter aids. More specifically the invention relates to a separable filter element which may be taken apart for cleaning. The Patent #1,867,397 issued to W. F. Brace et al. on July 12, 1932 illustrates the type of apparatus with which the invention is concerned.

In filtration of liquids having stringy or slimy ingredients, some of this substance passes through the fine mesh screens and is trapped in between the opposed filtering surfaces where it in time reduces the filtering rate very appreciably.

Heretofore the screens have not been made separable because it has been found difficult to effectively seal the screens without resorting to heavy space consuming constructions which required a great deal of time to tear down and reassemble.

It is an object of the invention to provide a separable filter element which can readily be torn down and reassembled.

It is a further object of the invention to provide a readily dismantelable filtering element which is cheap and simple.

A further object of the invention is to provide a separable filtering element which is held in assembled condition by means of readily applied clips.

Yet another object of the invention is to provide a two part filtering element, one part of which carries the filtrate outlet.

Another object of the invention is to provide a pair of screen panel retaining frames which are adapted to be sealed at their peripheral edges by pressure contact with a yieldable gasket.

It is a further object of the invention to provide screen panel frames which are held in sealing relation with a gasket by means of clips which engage the frames and comprises the gasket.

These and other objects will become apparent from a consideration of the following description in connection with the accompanying drawing in which:

Figure 1 is an elevation showing the filter element connected to the outlet manifold and the arrangement of clips on the edges of the element.

Figure 2 is a sectional view taken on the line 2—2 of Figure 1 showing shape of the frames, the arrangement of the screens, separating element and the clip.

Figure 3 is a sectional view taken on the line 3—3 of Figure 1 showing the filtrate outlet and the connection with the manifold.

Figure 4 is a bottom view of one of the clips showing the tapered edges of the groove.

Referring to Figure 1, the numeral 11 designates the filter element generally which is rectangular in elevation and which has a downwardly directed filtrate outlet 13 which is connected with a manifold 15 by means of a suitable nipple 17.

A plurality of clips 19 are spaced about the periphery of the element to hold the respective screens thereof in proper relation to each other.

The element 11 comprises two rectangular screens which are composed of a frame 21 which is formed of straight stock having an inner flange 23, a central groove 25, an outer flange 27 which is preferably not in the plane of flange 23 but is outward thereof, and a flange or lip 29 which is turned until it is substantially perpendicular to flanges 23 and 27.

The straight pieces are mitered as shown at 31 and joined, as by brazing, to form the frame and the corners of the frame are removed as indicated at 33 so as to expose the edges or lips 29 in order that clip 19 may be slipped on to hold the frames in proper relation.

An endless gasket 35 which is preferably of molded sponge rubber having a rectangular cross-section is fitted into the groove 25. The dimensions of the gasket are such that it fills the groove and when the clips are forced into position over the lips 29 of the frame, the gasket will be placed under a substantial compression so as to seal off the interior of the element.

A rectangular panel of screen 37 is fixed to each frame as shown in Figure 2. The screen is preferably of very fine mesh "Monel metal" and its edges are disposed in overlapping relation exteriorly of flanges 23 where they are soldered in place as indicated at 39.

Flanges 23 are of such thickness that a space sufficient to receive a supporting and separating element 41 preferably of coarse interwoven wire is adapted to fit within the frames 21 in contact with both panels 37 and it serves to transmit the force applied to the exterior of each of the panel to the interior of the other and thus it prevents collapse of the element while at the same time it permits free passage of the filtrate downwardly between panels 37 to the outlet 13.

The clips 19 are of C-shape cross-section as shown in Figure 2, and the distance between the inner edges 43 of the clips governs the amount of compression which will be given the gasket 35. Preferably, the amount of compression will be that which will bring the flanges 23 of each element into engagement. The sides or edges which engage the flanges 27 of the frames are straight except at the ends of the clip where they diverge as indicated at 45. This facilitates the operation of placing the clip in position on the frames which are normally urged apart by the pressure of the gasket. Once the flanges 27 are engaged by the edges 43 of the clip, the latter may readily be pushed into position.

Since the flow of liquid is through the screens 37 to the space between them, some provision must be made for withdrawing the filtrate and at the same time the separability of the screen must not be destroyed.

Applicant has accomplished this result by forming the outlet member 13 with a shoulder 47 which is adapted to engage the lower side of lip 29 on one of the frames. A concaved member 49 projects upward beyond the frame 21 and overlies an area of the panel 37 which is encompassed by a flange 51 on said member. The panel 37 is soldered to the inward or panel facing surface of the flange 51 so that no additional filtering surface is obstructed and then the portion of the panel encompassed by the flange is cut away because it would merely impede the flow of filtrate into the outlet opening without performing a useful function.

Flange 51 is bowed outwardly at 53 so as to pass over the frame 21 and the terminal portion 55 of the flange lies substantially flush with the inner face of flange 27. Two rivets 57, one on each side of the concave section hold the outlet member to the frame and the joint between these parts is strengthened and rendered leak proof by soldering or otherwise sealing it.

The chamber 59 formed by the concave portion 49 is connected by a passage 61 to a cylindrical portion 63 which is smooth walled and which is adapted to slidingly but closely engage a cylindrical projection 65 on nipple 17 which is screwed into the manifold 15. A gasket 67 may be confined between the end of the cylinder 59 and a shoulder 69 on the nipple so as to seal this connection.

When it is desired to clean the filter element, the connection with the manifold is broken by merely lifting the element upwardly. The clips 19 are then slid along and off the frames 21 and when the last clip has been withdrawn, the two halves of the element will part so that the course element 41 and gasket 35 may be removed and the internal surfaces of the panels 57 and frames may readily be cleaned. To assemble the element the above described process must obviously be reversed.

While applicant has disclosed a specific embodiment of his invention for purposes of illustration, it is obvious that various changes may be made in the form, construction and arrangement of parts without departing from the spirit of the invention. Accordingly, applicant desires protection not only upon the embodiment herein disclosed but also upon such embodiments as fall fairly within the scope of the appended claims.

What I claim to be new and desire to protect by Letters Patent of the United States is:

1. In a filtering element, a plurality of screens adapted to be joined in flat, superposed relation to each other and having means forming a liquid tight joint between them at their edges, said screens forming a filtrate chamber, an outlet means mounted on one of said screens and communicating with the filtrate chamber.

2. In a filtering element, a plurality of screens cooperating to form a filtrate chamber, means forming a separable liquid tight joint between said screens, an outlet means mounted on one of said screens and adapted to communicate with said filtrate chamber through the screen upon which it is mounted.

3. In a filtering element, a plurality of screens cooperating to form a filtrate chamber, means forming a separable liquid tight joint between said screens, an outlet conduit mounted on one of said screens in communication with said filtrate chamber, said conduit terminating in a connection which is substantially coaxial with the filtrate chamber.

4. In a filtering element, a plurality of screens comprising frames having panels of screening material mounted thereon, said screens cooperating to form a filtrate chamber, means forming a separable liquid tight joint between said frames, an outlet connection mounted on one of said frames and adapted to communicate with said filtrate chamber within the area bounded by the frame upon which it is mounted.

HARVEY E. MARVEL.